XR 2,916,691
X 1050D
Dec. 8, 1959 J. D. OWEN 2,916,691
ELECTRICAL WELL LOGGING
Filed Feb. 14, 1955 2 Sheets-Sheet 1
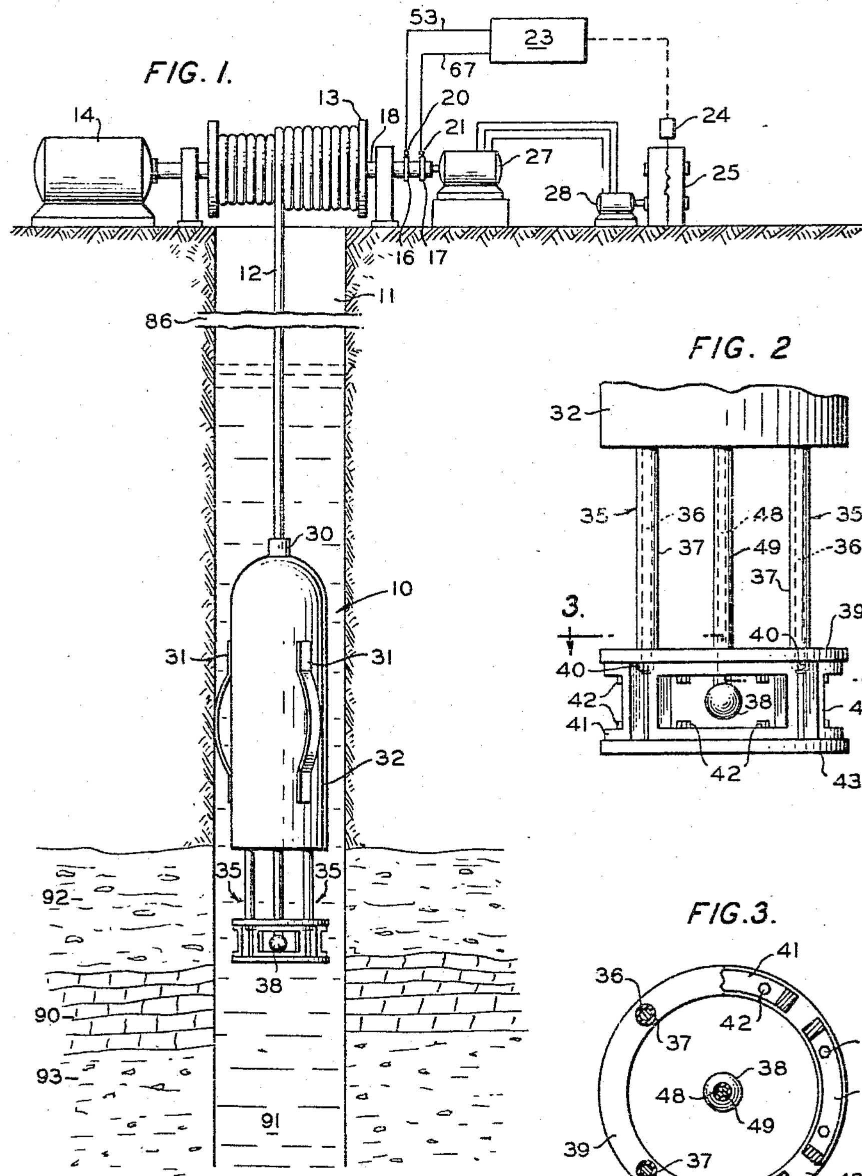
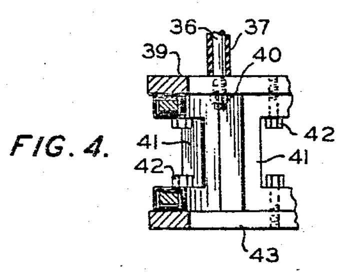
FIG. 4.
INVENTOR.
J. D. OWEN
BY *Hudson & Young*
ATTORNEYS

INVENTOR.
J. D. OWEN

BY Hudson & Young

ATTORNEY.

United States Patent Office 2,916,691

Patented Dec. 8, 1959

2,916,691

ELECTRICAL WELL LOGGING

Joe D. Owen, Bartlesville, Okla., assignor to Phillips Petroleum Company, a corporation of Delaware Application February 14, 1955, Serial No. 487,737

13 Claims. (Cl. 324—1)

This invention relates to a method of and apparatus for determining electrical properties of earth formations penetrated by bore holes.

In oil exploration and recovery operations it is often useful to have information regarding geological strata penetrated by bore holes. One important property that can readily be measured to provide such information is the electrical resistivity of the formations. Different types of earth formations have different electrical resistivities so that a knowledge of the resistivities is of value in identifying the particular formations.

In accordance with the present invention there is provided simplified well logging apparatus which can be employed to determine the electrical resistivity of formations surrounding bore holes. This apparatus includes a generally spherical electrode which is adapted to be lowered into a bore hole along the axis thereof. A source of alternating current is connected between the spherical electrode and a second grounded electrode, which can be positioned at the surface of the earth. One or more toroid coils surround the current emitting electrode and are lowered through the bore hole therewith. The current flow outwardly from the emitting electrode into the surrounding earth formations induces voltages in the coils of magnitudes proportional to the current through the center of the coils. The current pattern outwardly from the emitting electrode is a function of the electrical resistivities of the formations adjacent the electrode. Measurements of the voltages induced in the coils at various depths in the well thus provide indications of the resistivities of the formations penetrated by the bore hole.

Accordingly, it is an object of this invention to provide an improved method of measuring the electrical resistivities of formations penetrated by a bore hole.

Another object is to provide simplified apparatus for measuring the electrical resistivities of earth formations.

A further object is to provide apparatus which is capable of locating the boundaries between earth formations having different electrical resistivities.

Other objects, advantages and features of the invention should become apparent from the following detailed description, taken in conjunction with the accompanying drawing, in which:

Figure 1 is a schematic representation of well logging apparatus of this invention positioned within a bore hole;

Figure 2 is a detailed view of the electrode and coil assembly of Figure 1;

Figure 3 is a view taken along line 3—3 in Figure 2;

Figure 4 is a sectional view illustrating details of construction of the coil assembly.

Figure 5:
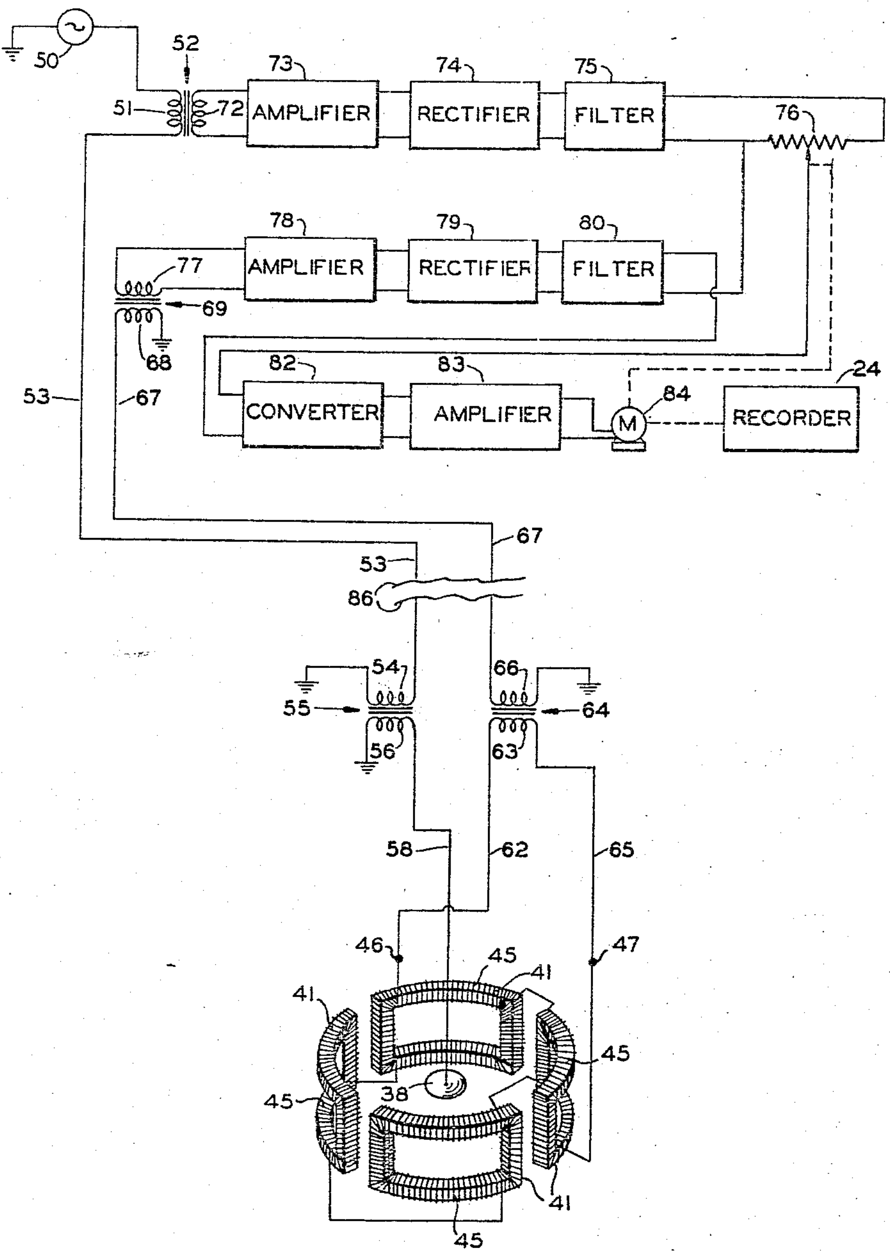
Figure 5 is a schematic circuit drawing of the electrical components of the logging apparatus of Figure 1.

Referring now to the drawing in detail and to Figure 1 in particular, there is illustrated a well logging assembly 10 which is suspended within a bore hole 11 by a cable 12. Cable 12 is attached at its upper end to a motivated reel 13 which is driven by a motor 14. Cable 12 contains a pair of electrical conductors, not shown in Figure 1, which terminate in respective slip rings 16 and 17 on the drive shaft 18 of reel 13. Slip rings 16 and 17 are engaged by respective brushes 20 and 21 which are electrically connected to a housing 23 that contains electrical components of the logging apparatus. The output signal from housing 23 energizes a recorder 24 which has a chart 25 associated therewith. Chart 25 is positioned in accordance with the depth to which housing 10 is lowered into bore hole 11. This can be accomplished by any suitable means, such as a generator 27 which is driven by drive shaft 18. Generator 27 energizes a motor 28 to move chart 25. The movement of chart 25 can be provided by a suitable mechanical linkage, if desired.

Assembly 10 is attached to the lower end of cable 12 by a coupling member 30. The upper casing 32 of assembly 10 is provided with a plurality of centering springs 31 which retain the assembly in the center of the bore hole. Casing 32 houses the electrical components of the logging apparatus which are positioned within the bore hole. As illustrated in greater detail in Figures 2, 3 and 4, a plurality of supports 35 depend from casing 32. These supports can be brass or other non-magnetic rods 36 surrounded by insulating sleeves 37. A first annular support member 39 of insulating material is secured to the lower ends of supports 35 by nuts 40 which are threaded to the lower ends of rods 36. A plurality of curved generally rectangular rings 41 of magnetic material depend from member 39 and are secured thereto by screws 42. These rings are spaced from one another as illustrated, see Figure 5 in particular. A second annular support ring 43 is secured to the lower edges of rings 41 by screws 42. A generally spherical electrode 38 is positioned along the axis of the assembly at substantially the midpoint between the planes of members 39 and 43. Electrode 38 is attached to the lower end of a support rod 48, which depends from casing 32. Rod 48 is surrounded by an insulating sleeve 49.

The electrical components of the logging apparatus are illustrated in Figure 5. A source of alternating current 50 is positioned at the surface. One terminal of current source 50 is grounded. The second terminal of current source 50 is connected through the primary winding 51 of a transformer 52 to a conductor 53 which extends into the bore hole through cable 12. Conductor 53 is connected at its lower end to the first terminal of the primary winding 54 of a transformer 55. The second end terminal of transformer winding 54 is grounded, as by being connected to casing 32 which is grounded at the surface by the sheath of cable 12, for example. The first end terminal of the secondary winding 56 of transformer 55 is connected by a lead 58 to spherical electrode 38. Lead 58 can be formed in part by the center support rod 48. The second end terminal of transformer winding 56 is grounded.

An electrical conductor 45 is wound in series aiding relationship on the four illustrated rings 41 so that a voltage is introduced between the end terminals 46 and 47 thereof when current emitted from electrode 38 is directed through the centers of rings 41. Adjacent turns of conductor 45 are electrically insulated from one another and from rings 41. Terminal 46 is connected by a lead 62 to the first end of the primary winding 63 of a transformer 64. Terminal 47 is connected by a lead 65 to the second end terminal of transformer winding 63. The first end terminal of the secondary winding 66 of transformer 64 is connected by a conductor 67, which extends through cable 12, to the first end terminal of the primary winding 68 of a transformer 69. The second end terminals of transformer windings 66 and 68 are grounded.

The circuit elements illustrated in the upper portion of

Figure 5 are provided to measure the voltage induced in coiled conductor 45. This voltage is measured as a function of the current emitted from electrode 38 so that fluctuations in the current emission do not affect the accuracy of the measurements. The end terminals of the secondary winding 72 of transformer 52 are connected to the input terminals of an amplifier 73 which is tuned to pass signals of the frequency of current source 50. The output terminals of amplifier 73 are connected to the input terminals of a rectifier 74, and the output terminals of rectifier 74 are connected to the input terminals of a filter 75. The output terminals of filter 75 are applied across the end terminals of a potentiometer 76. The direct voltage thus applied across potentiometer 76 is of magnitude proportional to the current flow from source 50.

The end terminals of the secondary winding 77 of transformer 69 are applied to the input terminals of an amplifier 78 which is tuned to pass signals of the frequency of current source 50. The output terminals of amplifier 78 are connected to the input terminals of a rectifier 79, and the output terminals of rectifier 79 are connected to the input terminals of a filter 80. The first output terminal of filter 80 is connected to one input terminal of a converter 82. The second input terminal of converter 82 is connected to the contactor of potentiometer 76. The second output terminal of filter 80 is connected to the second output terminal of filter 75. The voltage induced across the coils formed by conductor 45 is thus amplified, rectified and filtered. The magnitude of this voltage is applied in opposition to the voltage between the second output terminal of filter 75 and the contactor of potentiometer 76. If these two voltages are equal, there is no current flow to converter 82. If the two voltages are unequal, there is a current flow through the input circuit of converter 82 of a phase which is representative of the relative magnitudes of the two voltages being compared. Converter 82 changes the direct current flow in the input circuit thereof into a corresponding alternating current which is applied to the input terminals of an amplifier 83. The output terminals of amplifier 83 are connected to a reversible servo motor 84. The drive shaft of motor 84 is mechanically coupled to the contactor of potentiometer 78 and to recorder 24. The circuit comprising converter 82, amplifier 83, and servo motor 84 are shown only schematically, but can be any conventional circuit known in the art which converts a voltage difference into a corresponding motor rotation. A suitable circuit for this purpose is illustrated in The Electronic Control Handbook, Batcher and Moulic, Caldwell-Clements, Inc., New York, 1946, page 298, for example. Motor 84 moves the contactor of potentiometer 76 until the two voltages being compared are equal. The direction of rotation of motor 84 is determined by which of the two voltages being compared is of greater magnitude.

The circuit elements of Figure 5 illustrated above lines 86 are positioned at the surface, whereas the circuit elements illustrated below lines 86 are positioned within the bore hole. The purpose of transformers 64 and 69 is to eliminate the need for two additional conductors to extend through the bore hole to transmit the induced voltage signal. The common ground terminal can be provided by a metallic cable 12 through which conductors 53 and 67 extend. If desired, conductor 53 can be connected directly to spherical electrode 38 rather than through transformer 55. However, the use of transformer 55 permits the current to be transmitted through the bore hole at a relatively high voltage to reduce losses. Obviously, the measuring and recording apparatus could be contained within casing 32 if desired.

The operation of the apparatus of this invention can be described in conjunction with Figure 1. It is assumed that rock formation 90 has relatively high electrical resistivity. When electrode 38 is adjacent formation 90 there is a tendency for the current from electrode 38 to be diverted upwardly through the well fluid 91 into a formation 92, which has a lower electrical resistivity than does formation 90 and downwardly into a formation 93, which also has an electrical resistivity less than that of formation 90. Rings 41 intercept the current which is in a direction generally radially from electrode 38 in a horizontal plane. When electrode 38 is positioned adjacent bed 90, which has high resistivity, the voltage induced across conductor 45 is a relatively low amplitude. When the assembly is lowered so that electrode 38 is adjacent low resistance formation 93, more of the current is in a horizontal plane. This increased current through rings 41 introduces a higher voltage across conductor 45. It should be evident that the spherical current electrode 38 emits current radially outward. This current is concentrated in the directions of low electrical resistance. Rings 41 intercept that portion of the current in substantially a horizontal plane. While four rings 41 have been illustrated, fewer or more of these rings can be provided as desired. At least two rings are desired to obtain an average current distribution. However, if it is desired to measure current penetration in a single direction, only one ring is necessary. Also the coils can be positioned in any desired manner to measure current in selected directions. Rings 41 are generally in the shape of toroids, but are actually rectangular to simplify the construction and to concentrate the intercepted flow in a small vertical direction without the use of a large number of rings. The term "toroid" is thus employed herein to designate rings which may or may not be absolutely circular. If desired, separate conductors 45 can be mounted on each ring. The induced voltages in such conductors can be measured in series, as illustrated, in parallel, or separately. While electrode 38 has been shown as a sphere, practical construction limitations may require this electrode to be more cylindrical in shape. The electrode can be the end of the center rod 48 where the insulating sleeve 49 is removed. However, the more nearly spherical is electrode 38, the more nearly radial in all directions is the initial current distribution.

From the foregoing description it should be evident that there is provided in accordance with this invention simplified well logging apparatus which is capable of measuring the resistivity of surrounding earth formations with a high degree of accuracy. While the invention has been described in conjunction with a present preferred embodiment thereof, it should be evident that the invention is not limited thereto.

What is claimed is:

1. Electrical well logging apparatus comprising a housing adapted to be lowered into a well, an electrode carried by said housing so as to be positioned on the axis of the well when said housing is lowered into the well, and a plurality of toroid coils carried by said housing adjacent said electrode, said coils being positioned so that voltages are induced across the end terminals thereof by current emitted from said electrode when a source of fluctuating current is connected between said electrode and an electrically remote point of reference potential.

2. The combination in accordance with claim 1 wherein said coils are positioned in a circular path enclosing said electrode, the plane of said circular path being at substantially right angles with the axis of the well when said housing is lowered into a well, the planes of said coils being substantially perpendicular to lines extending radially in a horizontal plane from said electrode when said housing is positioned in a well.

3. The combination in accordance with claim 2 wherein said coils are connected in series relationship, and further comprising a cable containing at least two electrical conductors and secured at one end to said housing to lower said housing into a well, one of said conductors being connected to said electrode and the other of said conductors being connected to an end terminal of said connected coils.

4. Electrical well logging apparatus comprising a generally cylindrical housing adapted to be lowered into a well, a first insulating support extending from one end of said housing, an electrode secured to said first support in spaced relation with said housing, said electrode being positioned along the longitudinal axis of said housing, a plurality of rings of magnetic material, means extending from said one end of said housing to position said rings in spaced relation with one another in a circular path surrounding said electrode, the axis of said circular path being coaxial of the longitudinal axis of said housing, said rings being positioned in said path so that lines extending radially from said electrode extend through said rings, and conductors coiled about said rings to form toroid coils.

5. The method of determining electrical resistivities of earth formations intersected by a well which comprises positioning a spherical electrode in a well on the axis thereof, positioning a coil in the well in spaced relation with said electrode connecting a fluctuating source of current between said electrode and an electrically remote point of reference potential, and measuring the voltage induced across said coil.

6. The method of determining electrical resistivities of earth formations intersected by a well which comprises positioning an electrode in a well on the axis thereof, positioning a first toroid coil adjacent said electrode so that the axis of said first coil extends radially of the axis of the well, positioning a second toroid coil adjacent said electrode and spaced from said first coil so that the axis of said second coil extends radially of the axis of the well, connecting a fluctuating source of current between said electrode and an electrically remote point of reference potential, and measuring the voltages induced in said coils.

7. Electrical well logging apparatus comprising an electrode, means to suspend said electrode in a well at a position on the axis of the well, a source of fluctuating current, means connecting one terminal of said source to said electrode and the other terminal of said source to an electrically remote point of reference potential, a plurality of toroid coils, means positioning said coils adjacent said electrode so that current emitted from said electrode induces voltages between the end terminals of said coils, and means to measure said voltages.

8. The combination in accordance with claim 7 wherein said voltages are measured as a function of the current emitted from said electrode.

9. Electrical well logging apparatus comprising an electrode, means to suspend said electrode in a well at a position on the axis of the well, a source of fluctuating current, means connecting one terminal of said source to said electrode and the other terminal of said source to an electrically remote point of reference potential, a plurality of toroid coils, means positioning said coils adjacent said electrode so as to lie in substantially a horizontal plane when said electrode is suspended in a well and so that current emitted from said electrode induces voltages between the end terminals of said coils, and means to measure said voltages.

10. Electrical well logging apparatus comprising a generally spherical electrode, means to suspend said electrode, in a well at a position on the axis of the well, a source of fluctuating current, means connecting one terminal of said source to said electrode and the other terminal of said source to an electrically remote point of reference potential, a coil, means positioning said coil adjacent said electrode so that current emitted from said electrode induces voltages between the end terminals of said coil, and means to measure said voltages.

11. Electrical well logging apparatus comprising a generally spherical electrode, means to suspend said electrode, in a well at a position on the axis of the well, a source of fluctuating current, means connecting one terminal of said source to said electrode and the other terminal of said source to an electrically remote point of reference potential, a plurality of toroid coils, means positioning said coils adjacent said electrode so that current emitted from said electrode induces voltages between the end terminals of said coils, and means to measure said voltages.

12. The combination in accordance with claim 9 wherein said means to measure the voltages induced between the end terminals of said coils comprises circuit means to combine said voltages in series, means to establish a first voltage of magnitude proportional to the current emitted from said electrode, means to establish a second voltage proportional to said combined voltages, and means to compare said two established voltages.

13. The combination in accordance with claim 12 wherein said current source provides alternating current; said reference potential is ground potential; said means to establish a first voltage comprises a first transformer, the primary winding of said first transformer is connected in series with said current source and said electrode, a first rectifier, and means connecting the input terminals of said first rectifier to the secondary winding of said first transformer; said means to establish said second voltage comprises a second rectifier, and means connecting the end terminals of the series connected coils to the input terminals of said second rectifier; and said means to compare said two established voltages comprises a potentiometer, means connecting the output terminals of said first rectifier to respective end terminals of said potentiometer, means connecting the output terminals of said second rectifier to the contactor and one end terminal of said potentiometer, and means responsive to current flow through said last-mentioned means to adjust the position of the contactor of said potentiometer until there is zero current flow therethrough, the position of said contactor being representative of the relative magnitudes of said first and second voltages.

References Cited in the file of this patent

UNITED STATES PATENTS 2,723,374 Williams -------------- Nov. 8, 1955